United States Patent
Yang

(10) Patent No.: US 12,248,655 B2
(45) Date of Patent: Mar. 11, 2025

(54) ICON DISPLAY METHOD AND TERMINAL

(71) Applicant: VIVO MOBILE COMMUNICATION CO., LTD., Guangdong (CN)

(72) Inventor: Qihao Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 35 days.

(21) Appl. No.: 17/673,067

(22) Filed: Feb. 16, 2022

(65) Prior Publication Data

US 2022/0171521 A1     Jun. 2, 2022

Related U.S. Application Data

(63) Continuation of application No. PCT/CN2020/106799, filed on Aug. 4, 2020.

(30) Foreign Application Priority Data

Aug. 16, 2019    (CN) .......................... 201910757233.9

(51) Int. Cl.
| | |
|---|---|
| *G06F 3/04817* | (2022.01) |
| *G06F 3/0482* | (2013.01) |
| *G06F 3/0483* | (2013.01) |
| *G06F 3/0486* | (2013.01) |

(52) U.S. Cl.
CPC ........ *G06F 3/04817* (2013.01); *G06F 3/0482* (2013.01); *G06F 3/0483* (2013.01); *G06F 3/0486* (2013.01)

(58) Field of Classification Search
None
See application file for complete search history.

(56) References Cited

U.S. PATENT DOCUMENTS

| | | | |
|---|---|---|---|
| 10,121,184 B2 * | 11/2018 | Godsey | .............. G06Q 30/0635 |
| 2003/0043202 A1 * | 3/2003 | Finley, Jr. | ........... G06F 3/04817 |
| | | | 715/810 |
| 2008/0288867 A1 | 11/2008 | Jeong et al. | |

(Continued)

FOREIGN PATENT DOCUMENTS

| | | |
|---|---|---|
| CN | 101309323 A | 11/2008 |
| CN | 103809848 A * | 5/2014 |

(Continued)

OTHER PUBLICATIONS

CN Office Action in Application No. 201910757233.9 Dated Sep. 3, 2020.

(Continued)

*Primary Examiner* — Mandrita Brahmachari
(74) *Attorney, Agent, or Firm* — BROOKS KUSHMAN P.C.

(57) ABSTRACT

An icon display method and a terminal. The method includes: receiving a first input performed by a user on a first icon, the first icon located at a first position on a first page; displaying, in response to the first input, a first identifier at the first position or a position associated with the first position; receiving a second input performed by a user on a second page; displaying, in response to the second input, a second identifier at a second position on the second page; and displaying, at the second position, the first icon or an icon associated with the first icon.

16 Claims, 22 Drawing Sheets

(56) References Cited

U.S. PATENT DOCUMENTS

| | | | |
|---|---|---|---|
| 2010/0235770 A1* | 9/2010 | Ording | G06F 3/04886 715/810 |
| 2010/0295789 A1* | 11/2010 | Shin | G06F 1/1626 715/765 |
| 2011/0252346 A1 | 10/2011 | Chaudhri | |
| 2011/0252350 A1* | 10/2011 | Chaudhri | G06F 3/04812 715/769 |
| 2012/0079432 A1* | 3/2012 | Lee | G06F 3/04883 715/810 |
| 2012/0185789 A1* | 7/2012 | Louch | G06F 3/0488 715/769 |
| 2013/0125043 A1* | 5/2013 | Jeon | G06F 3/04815 345/173 |
| 2014/0143698 A1* | 5/2014 | Kim | G06F 3/0488 715/768 |
| 2015/0052430 A1* | 2/2015 | Dwan | G06F 3/04883 715/702 |
| 2015/0089410 A1 | 3/2015 | Liu | |
| 2015/0089418 A1* | 3/2015 | Tan | G06F 3/0488 715/765 |
| 2015/0169218 A1* | 6/2015 | Cromer | G06F 3/04886 715/773 |
| 2016/0011775 A1* | 1/2016 | Guo | G06F 3/0486 715/765 |
| 2018/0364875 A1 | 12/2018 | Lee et al. | |
| 2019/0034061 A1* | 1/2019 | Liu | G06F 3/0486 |
| 2019/0208037 A1* | 7/2019 | Yang | A63F 13/358 |

FOREIGN PATENT DOCUMENTS

| | | | |
|---|---|---|---|
| CN | 107491239 A | | 12/2017 |
| CN | 107544740 A | | 1/2018 |
| CN | 107562336 A | * | 1/2018 |
| CN | 108920040 A | | 11/2018 |
| CN | 109683763 A | | 4/2019 |
| CN | 109683802 A | | 4/2019 |
| CN | 109814772 A | | 5/2019 |
| CN | 110515507 A | | 11/2019 |
| JP | 2013-105495 A | | 5/2013 |
| KR | 20130016329 A | | 2/2013 |
| KR | 20150033508 A | | 4/2015 |

OTHER PUBLICATIONS

Written Opinion and International Search Report in Application No. PCT/CN2020/106799 Dated Nov. 9, 2020.
European Search Report in Application No. 20854052.6 Dated Sep. 21, 2022.
JP Office Action dated Mar. 7, 2023 as received in Application No. 2022-510180.
First Office Action for Korean Application No. 10-2022-7008518, dated Apr. 22, 2024, 6 Pages.

* cited by examiner

ICON DISPLAY METHOD AND TERMINAL

CROSS-REFERENCE TO RELATED APPLICATION

This application is a continuation application of International Application No. PCT/CN2020/106799 filed on Aug. 4, 2020, which claims priority to Chinese Patent Application No. 201910757233.9 filed in China on Aug. 16, 2019, which is incorporated herein by reference in its entirety.

TECHNICAL FIELD

Embodiments of the present disclosure relate to the field of communications technologies, and in particular, to an icon display method and a terminal.

BACKGROUND

With the development of terminals, more and more applications are supported by the terminals, and users usually have many applications installed on their terminals so as to adapt to the needs of various scenarios.

For an application that has been installed, a terminal usually displays a corresponding application icon on its desktop, and a user can manage, for example, move, categorize, the application icon by operating the application icon on the desktop. However, in the case that application icons are distributed on different pages, and if a certain application icon needs to be moved from one page to another, a user has to operate both the page and the icon simultaneously so as to switch the page and move the icon simultaneously. In this operation process, the user is even required to perform an operation by both hands, which is cumbersome.

SUMMARY

The embodiments of the present disclosure provide an icon display method and a terminal.

According to a first aspect, an embodiment of the present disclosure provides an icon display method including:
receiving a first input performed by a user on a first icon, the first icon is located at a first position on a first page;
displaying, in response to the first input, a first identifier at the first position or a position associated with the first position;
receiving a second input performed by a user on a second page;
displaying, in response to the second input, a second identifier at a second position on the second page;
displaying, at the second position, the first icon or an icon associated with the first icon.

According to a second aspect, an embodiment of the present disclosure further provides a terminal including:
a first receiving module, configured to receive a first input performed by a user on a first icon, the first icon located at a first position on a first page;
a first display module, configured to display, in response to the first input, a first identifier at the first position or a position associated with the first position;
a second receiving module, configured to receive a second input performed by a user on a second page;
a second display module, configured to display, in response to the second input, a second identifier at a second position on the second page;
a third display module, configured to display, at the second position, the first icon or an icon associated with the first icon.

According to a third aspect, an embodiment of the present disclosure further provides a terminal, including: a memory, a processor, and a computer program stored in a memory and capable of running on a processor. When the computer program is executed by the processor, steps of the foregoing icon display method are implemented.

According to a fourth aspect, an embodiment of the present disclosure further provides a computer-readable storage medium. The computer-readable storage medium stores a computer program, and when the computer program is executed by a processor, steps of the icon display method described above are implemented.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments acquired by a person of ordinary skill in the art based on the embodiments of the present disclosure without creative efforts shall fall within the protection scope of the present disclosure.

Figure 1:
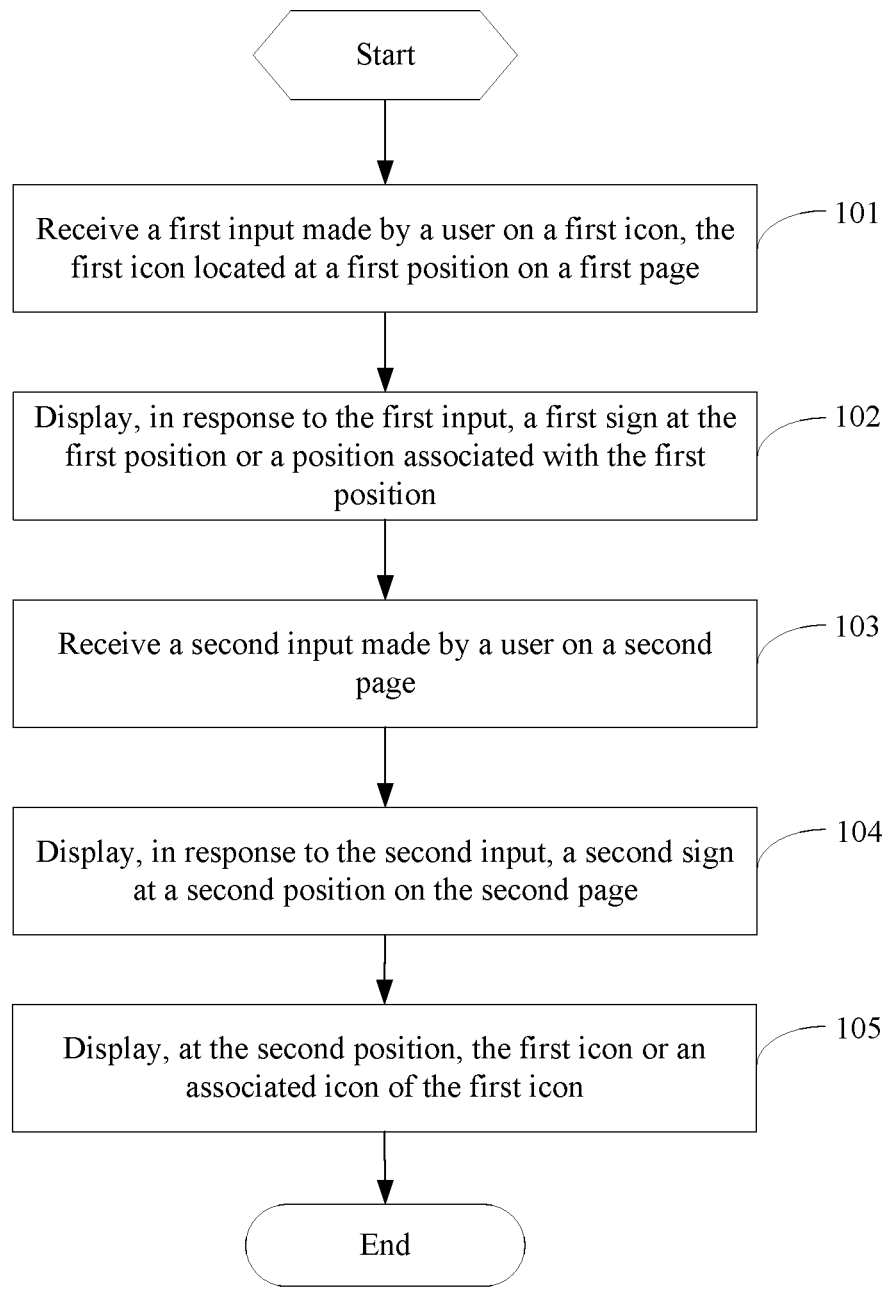
FIG. 1 is a first flowchart of an icon display method according to an embodiment of the present disclosure.

Referring to FIG. 1, FIG. 1 is a flowchart of an icon display method according to an embodiment of the present disclosure. As shown in FIG. 1, the method includes the following steps:

Step 101. Receive a first input performed by a user on a first icon, the first icon located at a first position on a first page.

The first page may be a page for displaying an application icon. For example, desktop application icons of a terminal are distributed on multiple pages, and the first page may be any one of the multiple pages.

The foregoing first input may be a tap input, a dragging input, or a sliding input on the first icon, or the first input may be a first operation. For example, the user drags a first identifier onto the first icon on the first page, or the user performs a sliding operation on the first icon.

Optionally, before the receiving a first input performed by a user on a first icon, the method further includes:
displaying a first identifier in a first region of the first page;
the receiving a first input performed by a user on a first icon includes:
receiving a first input of dragging a first identifier located in the first region from the first region onto the first icon performed by a user;

displaying, in response to the first input, a first identifier at the first position or a position associated with the first position includes:

moving, in response to the first input, the first identifier from the first region to the first position or a position associated with the first position.

In this implementation manner, the user may perform a first input on the first identifier displayed in the first region, that is, dragging the first identifier from the first region onto the first position. The first identifier may move with the position movement of the first input until the first identifier is moved to, when the first input ends, the first position where the first icon is located or the position associated with the first position.

Figure 1A:
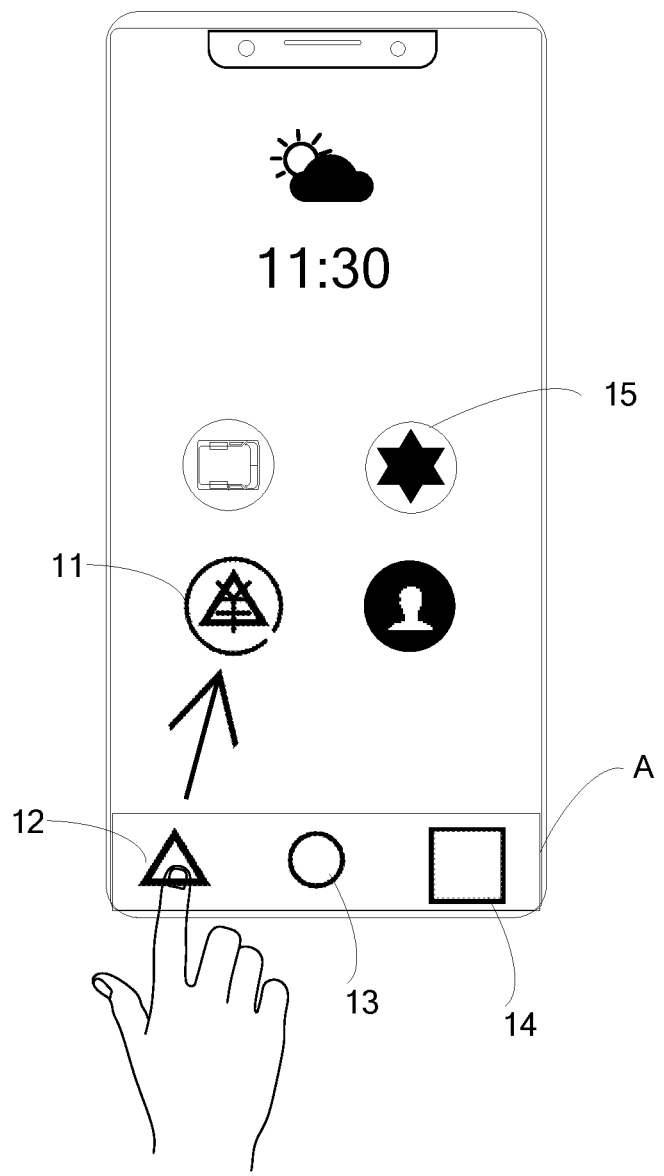
FIGS. 1a-1k are interface diagrams of a terminal according to an embodiment of the present disclosure.

For example, as shown in FIG. 1a, a user performs a dragging operation on a first identifier 12 in a first region A of a first page, and a terminal displays the first identifier 12 at a first position where a first icon 11 is located.

In this implementation manner, the user can quickly determine the first icon by operating the first identifier in the first region, which can enhance user operation convenience and efficiency.

Optionally, the displaying a first identifier in a first region of the first page includes:

receiving a third input performed by a user; and in response to the third input, displaying, in the first region of the first page, at least one identifier including the first identifier, and displaying, in a second region of a second page, at least one identifier including a second identifier.

In this implementation manner, the third input may be a sliding input, a press input, or a click input performed by the user on the first page. The terminal displays at least one identifier in the first region of the first page, the at least one identifier including the first identifier; and displays at least one identifier in the second region of the second page, the at least one identifier including the second identifier. Each identifier can be used to indicate a processing method for the first icon, for example, to move the first icon, to create an icon associated with the first icon.

The first region may be a fixed region, that is, as the first page is switched to the second page, the position of the first region remain unchanged, that is, it is not switched; or the first region may be a partial region of the first page, and this partial region can be switched while the first page is switched; or the first region may be a floating region. For the explanation of the second region, reference may be made to the foregoing first region, and details are not described herein again.

The first region and the second region may be a same region or different regions, and a identifier in the first region and a identifier in the second region may be the same or different.

Figure 1B:
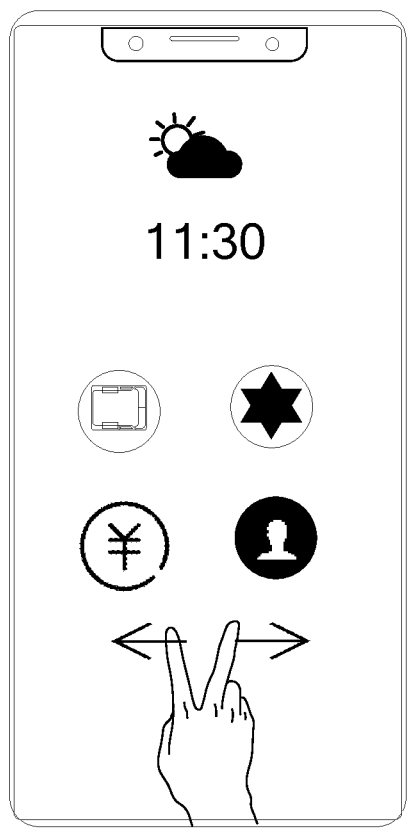
Figure 1C:
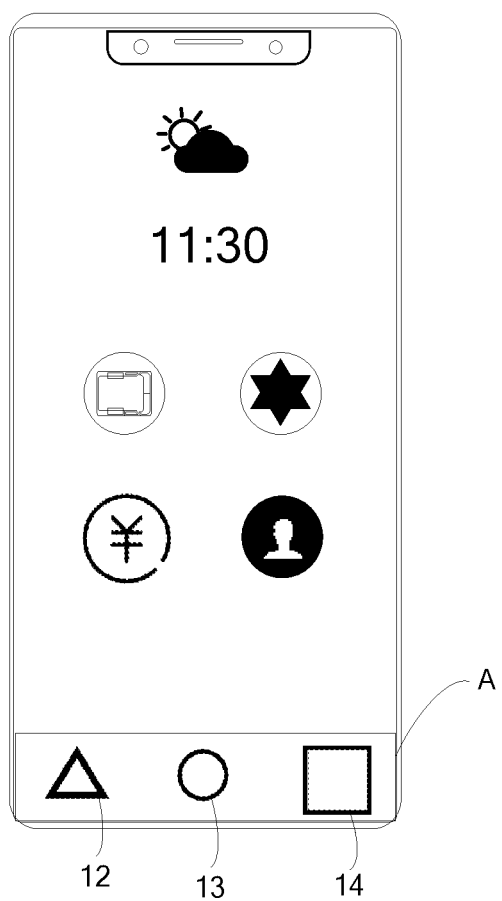

For example, as shown in FIG. 1b, the user performs an operation of sliding toward opposite directions on the first page with two fingers. At this time, in response to the operation by the user, the terminal displays a first identifier 12, a first identifier 13, and a first identifier 14 in a first region A of the first page, as shown in FIG. 1c. The first identifier 12 may be used to instruct moving a first icon, the first identifier 13 may be used to instruct performing position exchange for a first icon of a first page and a second icon of a second page, and the first identifier 14 may be used to instruct creating an clone icon for a first icon at a second position on a second page. Additionally, at least one second identifier may be displayed in the second region of the second page using the foregoing method.

In this way, the terminal displays the first region and the second region of the first page and the second page respectively, and the user can operate the identifiers in the first region and the second region, thereby implementing cross-page icon management and enhancing operation convenience.

Optionally, after the displaying, in the first region of the first page, at least one identifier including the first identifier, and displaying, in a second region of the second page, at least one identifier including the second identifier, and before the receiving a first input of dragging a first identifier located in the first region from the first region onto the first icon by a user, the method further includes:

receiving a fourth input performed by a user; and in the case that an operation direction of the fourth input is a first direction, switching an operation mode for an icon from a current first mode to a second mode;

where the first mode is a mode for operating a single icon, and the second mode is a mode for operating at least two icons; or, the first mode is a mode for operating at least two icons, and the second mode is a mode for operating a single icon.

In this implementation manner, the fourth input may be a sliding operation, a dragging operation, a press operation, or the like. The user can control switching an operation mode for an icon by performing the fourth input. The operation mode for a single icon may be understood as a user operating a single icon, and a terminal processing this single icon; the operation mode for multiple icons may be understood as a user operating multiple icons simultaneously or sequentially, and a terminal processing the multiple icons simultaneously.

Figure 1D:
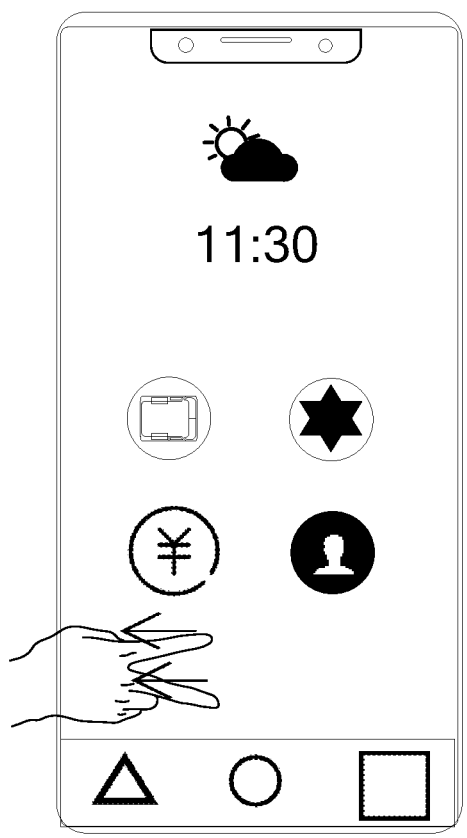

For example, the terminal is displayed as a multiple-icon operation interface, that is, an interface for a multiple-icon operation mode. In the foregoing multiple-icon operation mode, a user can operate multiple icons, thereby controlling a terminal to simultaneously display multiple icons or icons associated with multiple icons at multiple second positions of the second page. If a user performs an operation of sliding to the left on the foregoing interface with two fingers, as shown in FIG. 1d, a terminal switches a current multiple-icon operation mode to a single-icon operation mode. In the single-icon operation mode, a user can operate a single icon, thereby controlling a terminal to display a single icon or an icon associated with a single icon in a second position on a second page.

Figure 1E:
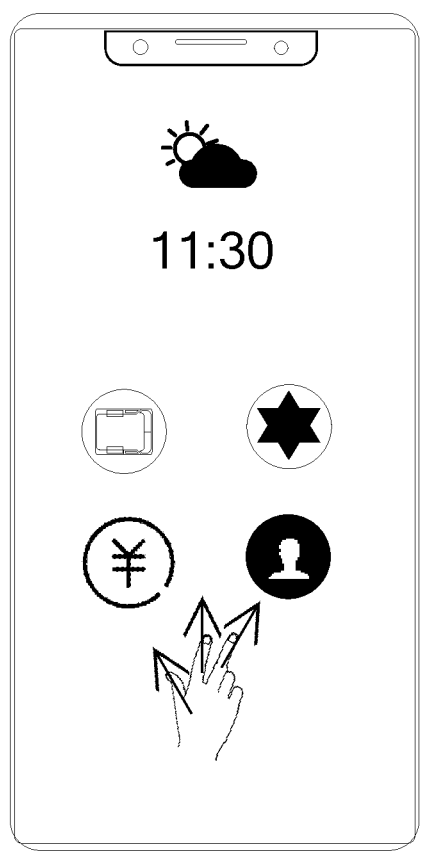

Further, before performing the fourth input, the user can control the terminal to display an interface for different operation modes by performing different operations. For example, as shown in FIG. 1e, the user performs an operation of sliding outward on a first page using three fingers, and the terminal is displayed as a multiple-icon operation interface; as shown in FIG. 1b, a user performs sliding toward opposite directions on a first page with two fingers, thus a terminal displays a single-icon operation interface.

In this way, a user can trigger a terminal to enter different application icon operation modes through different operation manners, and the user can trigger the terminal to perform mode switching through an operation. Using different operation modes can prevent a user from performing a misoperation and can enhance operation efficiency.

Step 102. Display, in response to the first input, a first identifier at the first position or a position associated with the first position.

The first identifier may always be displayed on the first page, that is, the first identifier is displayed simultaneously when the first page is displayed; or it may be a identifier displayed in response to the first input after the first page is displayed. The user may operate the displayed first identifier to display the first identifier at the first position or an associated position of the first position. The first identifier may also be generated based on the first input performed by the user. For example, it is generated according to an input track of the first input or generated according to an input position of the first input. The first identifier may be a geometry, an arrow, or another graph. The first identifier may be used to indicate a position of the first icon, or it may be used to indicate a processing method for the first icon, such as moving, creating a new icon. The first identifier may be displayed in a floating manner or may be displayed in a fixed region, which is not limited herein.

The first position may be a position where the first icon is located, the position associated with the first position may be a corresponding position in the vicinity of the first position, or a position corresponding to an icon associated with the first icon. For example, the first icon includes an clone icon, the first icon is located at the first location, and the location associated with the first location may be a location where the clone icon is located.

Optionally, the displaying, in response to the first input, a first identifier at the first position or a position associated with the first position includes:

acquiring a first input track of the first input;

generating the first identifier according to a first input track of the first input; and displaying the first identifier at the first position or a position associated with the first position.

In this implementation manner, the terminal generates the first identifier according to a first input track of the first input. For example, if the user performs a sliding operation on the first icon, and a track of the sliding operation is a circle, the terminal generates a circular identifier according to the sliding track, and displays the circular identifier on the first icon. If the user performs a sliding operation on two or more icons, the first identifier is displayed on each of the two or more icons.

Figure 1F:
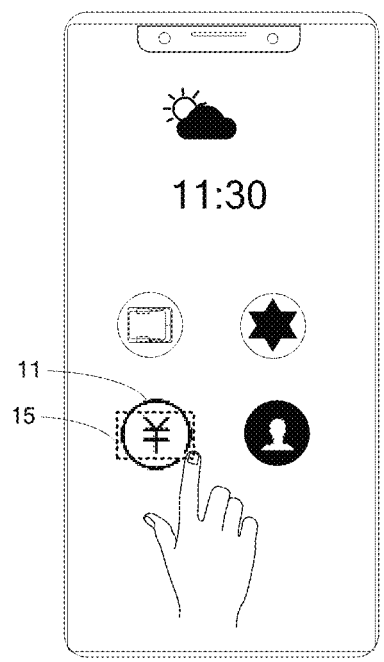

For example, as shown in FIG. 1f, if the user performs a sliding operation on a first icon 11, and a sliding track is a rectangle, the terminal generates a first identifier 15 according to the sliding track, and displays the first identifier 15 on the first icon.

In this way, it is convenient for the user to quickly determine the first icon on the first page, facilitating convenient and flexible user operation and enhancing operation efficiency.

Step 103: Receive a second input performed by a user on a second page.

The first page and the second page may be pages for displaying application icons.

The user may perform the second input on the second page. For the explanation of the second input, reference may be made to the foregoing first input.

The second input may be an input targeting a specific object, for example, a dragging input targeting a second identifier; or it may be an input performed in a blank region of the second page, such as a sliding operation in the blank region.

Optionally, before the receiving a second input performed by a user on a second page, the method further includes:

displaying a second identifier in a second region of the second page;

the receiving a second input performed by a user on a second page includes:

receiving a second input of dragging a second identifier located in the second region from the second region to a second position on the second page by a user;

The displaying, in response to the second input, a second identifier at a second position on the second page includes:

moving, in response to the second input, the second identifier from the second region to the second position.

In this implementation manner, the second identifier may be displayed based on a user's input, or the second identifier may be displayed while the second page is displayed.

The second identifier may be an identifier displayed in the second region of the second page, and the second identifier may be used to indicate a processing method for the first icon. The user can perform a second input on the second identifier, that is, dragging the second identifier from the second region to the second position. In response to the second input, the terminal moves the second identifier to the second position.

Figure 1G:
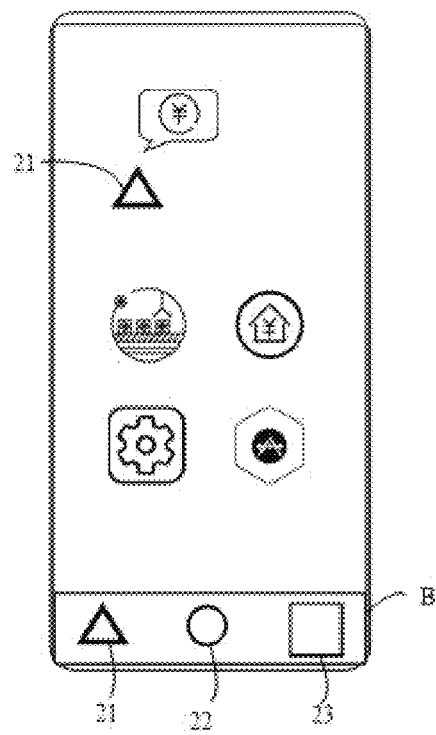

For example, as shown in FIG. 1g, a user performs a dragging operation on a second identifier 21 on a second page, that is, the second input, and a terminal displays the second identifier 21 at a second position in response to the user's operation.

In this way, the user can quickly determine the second position where the first icon needs to be displayed by operating the second identifier in the second region, which can enhance user operation convenience and efficiency.

Step 104. Display, in response to the second input, a second identifier at a second position on the second page.

For the explanation of the second input, reference may be made to the first input, and for the explanation of the second identifier, reference may be made to the first identifier, where the second identifier may be used to indicate the second position on the second page. The foregoing second identifier may be displayed at the second position by operating the displayed second identifier, or it may be generated based on the second input performed by the user.

Optionally, the displaying, in response to the second input, a second identifier at a second position on the second page includes:

acquiring a second input track of the second input;

generating the second identifier according to a second input track of the second input; and displaying the second identifier at a second position on the second page.

In this implementation manner, the terminal may generate the second identifier according to the second input track of the second input. For example, the user performs a sliding operation on the second page, a track of the sliding operation is a triangle, and the terminal generates a triangle identifier according to the sliding track, and displays the triangle identifier at the second position on the second page, where the identifier can be used to indicate the second position, which is convenient for the user to view the second position.

In this way, it is convenient for the user to quickly determine the second position on the second page, facilitating convenient user operation, and enhancing user operation efficiency and flexibility.

Step 105. Display, at the second position, the first icon or an icon associated with the first icon.

In this step, the first icon may be displayed at the second position, and the first icon on the first page may be hidden after the first icon is displayed, so that the first icon on the first page can be moved to the second page. Alternatively, an icon such as an clone icon for the first icon may be created at the second position.

If there is a second icon at the second position, an icon associated with the first icon and the second icon may be created at the second position. If the associated icon is operated, an application corresponding to the first icon and an application corresponding to the second icon may be enabled simultaneously; the foregoing associated icon may further be an clone icon for a first application icon, that is, an icon of an application with the same function as the first application. Alternatively, if there is a second icon at the second position, the positions of the first icon and the second icon may be exchanged.

For easy understanding of this embodiment, examples are given below in combination with specific implementation manners.

As shown in FIG. 1a, the interface shown in FIG. 1a is a first page, and a first identifier 12, a first identifier 13 and a first identifier 14 are displayed in a first region A of the first page. The interface shown in FIG. 1g is a second page, and a second identifier 21, a second identifier 22, and a second identifier 23 are displayed in a second region B of the second page.

Case 1. The user drags the first identifier 12 from the first region A to the first icon 11 on the first page, and the terminal displays the first identifier 12 at the position where the first icon 11 is located. The user switches from the first page to the second page, and the second page is shown in FIG. 1g. The user drags the second identifier 21 on the second page from the region B to a second location on this page, and the terminal displays the second identifier 21 at this second location. The terminal acquires a movement function corresponding to the first identifier 12 and the second identifier 21, and moves the first icon 11 from the first page to the second position on the second page.

Figure 1H:
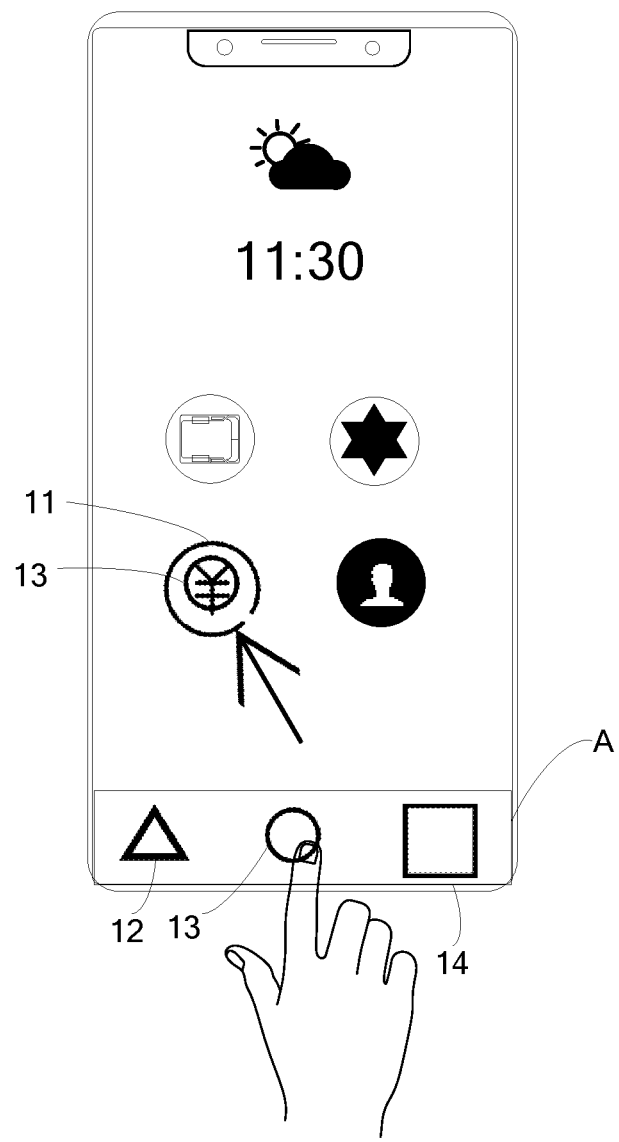
Figure 1I:
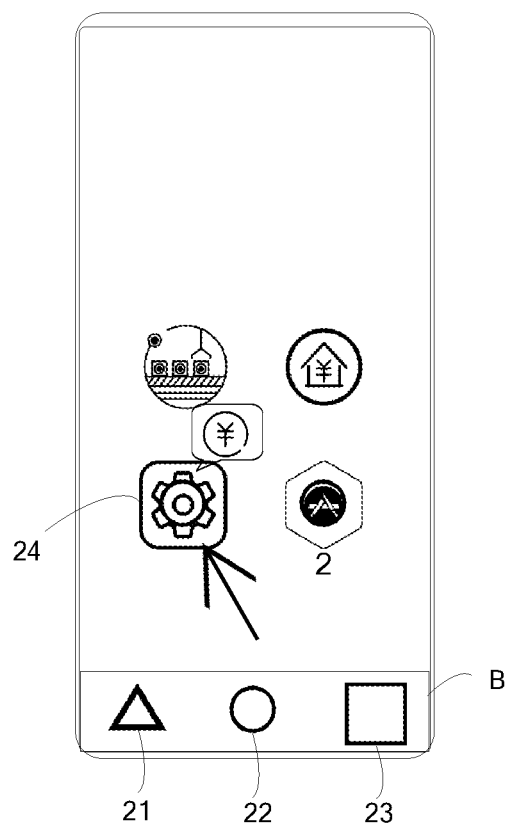

Case 2. The user drags the first identifier 13 from the first region A to the first icon 11 on the first page, and the terminal displays the first identifier 13 at the location where the first icon 11 is located, as shown in FIG. 1h. The user switches from the first page to the second page. As shown in FIG. 1i, the user drags the second identifier 22 on the second page from the region B to a second position on this page, and the terminal displays the second identifier 22 at this second position, and acquires a second icon 24 corresponding to this position. The terminal acquires a position exchange function corresponding to the first identifier 13 and the second identifier 22, and exchanges positions of the first icon 11 and the second icon 24.

Figure 1J:
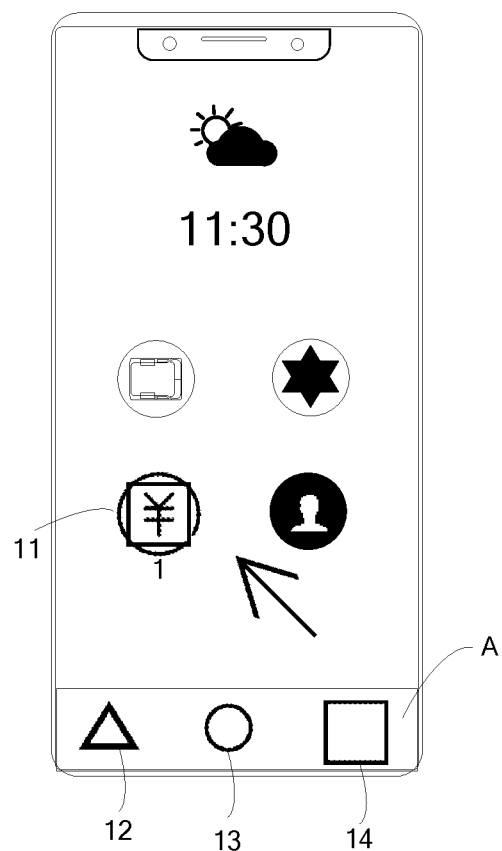
Figure 1K:
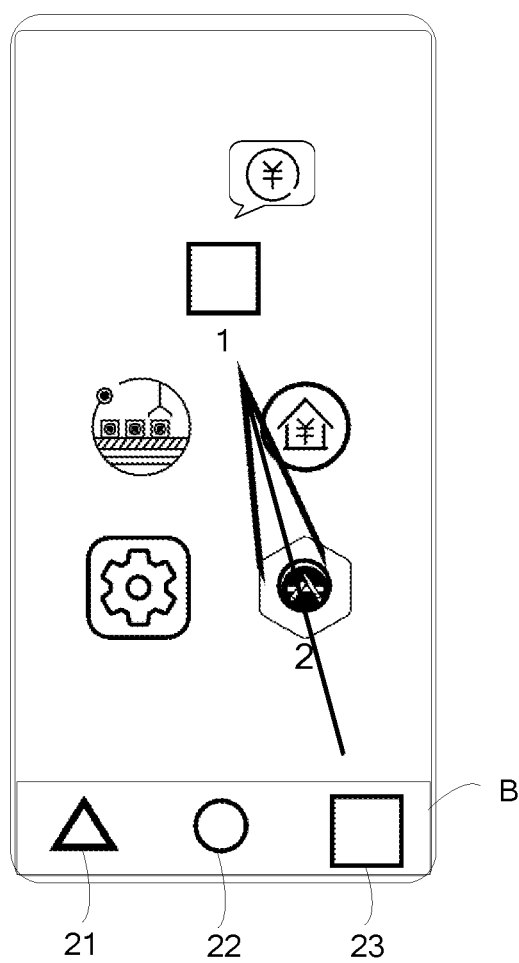

Case 3. The user drags the first identifier 14 from the first region A to the first icon 11 on the first page, and the terminal displays the first identifier 14 at the location where the first icon 11 is located, as shown in FIG. 1j. The user switches from the first page to the second page. As shown in FIG. 1k, the user drags the second identifier 23 on the second page from the region B to a second position on this page, and the terminal displays the second identifier 23 at this second position. The terminal acquires an icon creation function corresponding to the first identifier 14 and the second identifier 23, and creates an clone icon for the first icon at the second position on the second page.

The foregoing description is merely an example. The first position and the second position may also be on a same page. The user may operate in the foregoing manner to control the terminal to display the first icon or the icon associated with the first icon at a second position on a same page as the first icon. For example, if the user drags a first identifier on a first page to an icon A on this page, and drags a second identifier on the first page to an icon B on this page, positions of the icon A and the icon B are exchanged. This is merely an example. The solutions such as icon exchange, movement, or icon creation on a same page all fall within the protection scope of the embodiments of the present disclosure.

In this embodiment of the present disclosure, the foregoing icon display method may be applied to a terminal such as a mobile phone, a tablet personal computer (Tablet Personal Computer), a laptop computer (Laptop Computer), a personal digital assistant (personal digital assistant, PDA), a mobile Internet device (Mobile Internet Device, MID), or a wearable device (Wearable Device).

The icon display method of this embodiment of the present disclosure includes receiving a first input performed by a user on a first icon, the first icon located at a first position on a first page; displaying, in response to the first input, a first identifier at the first position or a position associated with the first position; receiving a second input performed by a user on a second page; displaying, in response to the second input, a second identifier at a second position on the second page; and displaying, at the second position, the first icon or an icon associated with the first icon. In this way, the user can control the terminal to display, on the second page, the application icon on the first page by performing operations on the first page and the second page, which facilitates convenient user operation and can enhance operation efficiency.

Figure 2:
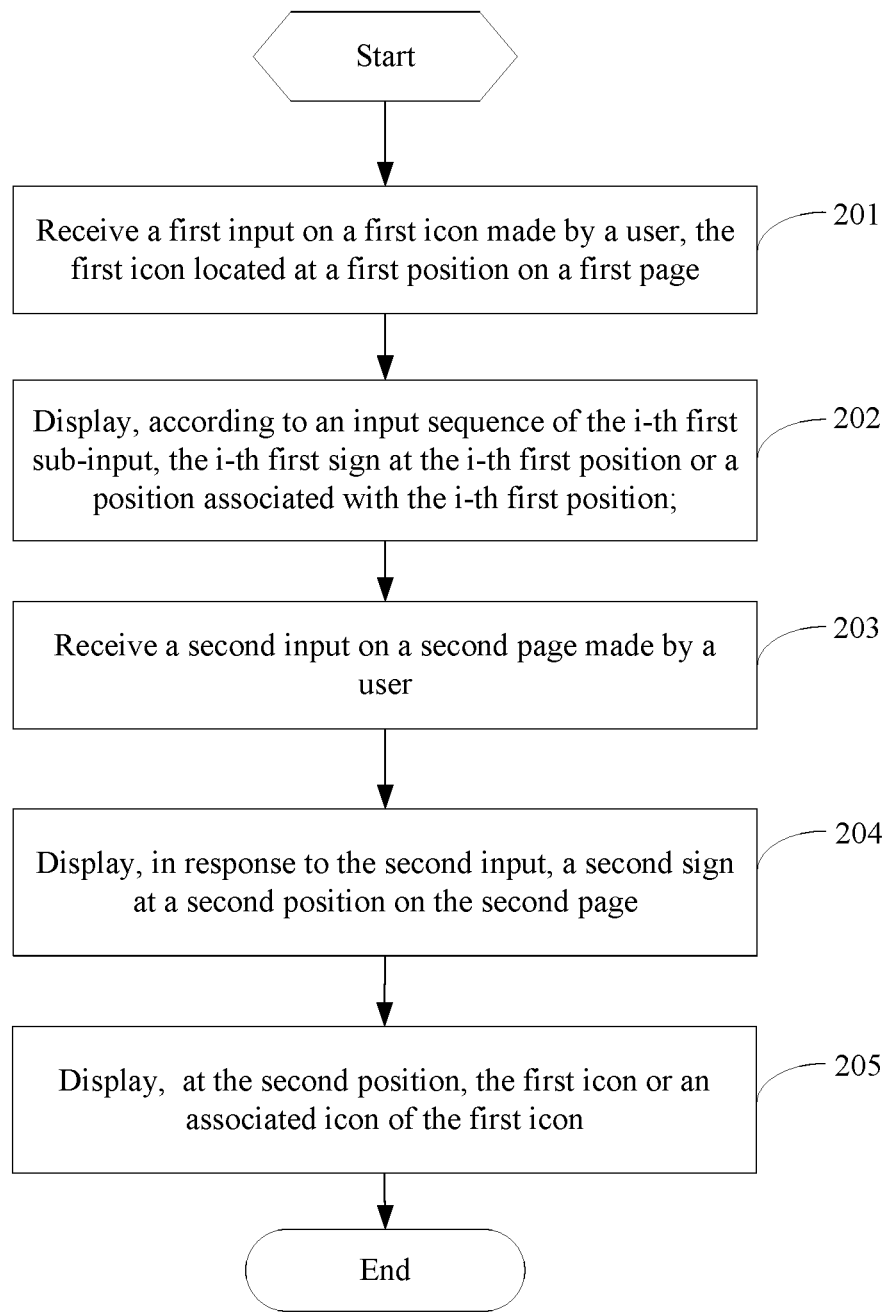
FIG. 2 is a second flowchart of an icon display method according to an embodiment of the present disclosure.

Referring to FIG. 2, FIG. 2 is a flowchart of another icon display method according to an embodiment of the present disclosure. A difference between this embodiment and the foregoing embodiment lies in that a quantity of first icons is N, and N is an integer greater than 1; the first input includes N first sub-inputs, and each first sub-input acts on one first icon.

Step 201. Receive a first input performed by a user on a first icon, the first icon located at a first position on a first page.

The first input includes N first sub-inputs, and N is an integer greater than 1. For example, the user performs two operations on two icons respectively on a first page. The N sub-inputs may be the same or different sub-inputs, and each first sub-input acts on one first icon to determine a position of a first icon.

Step 202. Display, according to an input sequence of an $i^{th}$ first sub-input, an $i^{th}$ first identifier at an $i^{th}$ first position or a position associated with the $i^{th}$ first position;

where i is a positive integer and i≤N.

In this step, one first identifier may be displayed, according to an input sequence, at a position corresponding to an icon on which each first sub-input is operated. For example, as shown in FIG. 1a, a user drags the first first identifier 12 on a first page to a first position where an icon 11 is located, and the first first identifier 12 is displayed on the first position where the icon 11 is located; the user then drags the second first identifier 12 to a first position where an icon 15 is located, and the second first identifier 12 is displayed on the first position where the icon 15 is located.

Step 203: Receive a second input performed by a user on a second page.

Step 204. Display, in response to the second input, a second identifier at a second position on the second page.

Step 205. Display, at the second position, the first icon or an icon associated with the first icon.

For the explanation of step 201, step 203, step 204, and step 205, reference may be made to the description of the foregoing embodiment, and details are not described herein again.

Optionally, the second input includes N second sub-inputs, and each second sub-input is used to determine one second position on the second page;

The displaying, in response to the second input, a second identifier at a second position on the second page includes:

displaying a $k^{th}$ second identifier at a $k^{th}$ second position on the second page according to an input sequence of a $k^{th}$ second sub-input;

where k is a positive integer and k≤N.

In this embodiment, when the user performs a second input on the second page, the terminal may record a sequence for each second sub-input, so as to display a second identifier in the foregoing sequence. For example, if the user drags the first second identifier to the first second position, the first second identifier is displayed at this position; the user then drags the second second identifier to the second second position, the second second identifier is displayed at this position.

In addition, an identifier may be added according to a sequence of inputs.

For easy understanding of this embodiment, examples are given below in combination with specific implementation manners.

Figure 2A:
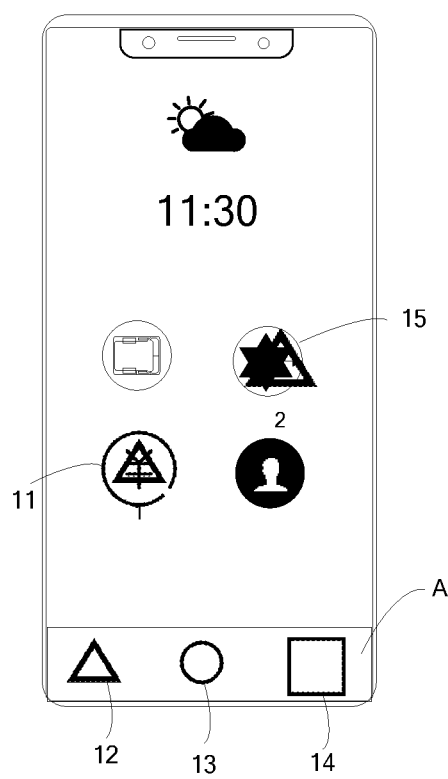
FIGS. 2a-2h are interface diagrams of a terminal according to an embodiment of the present disclosure.
Figure 2B:
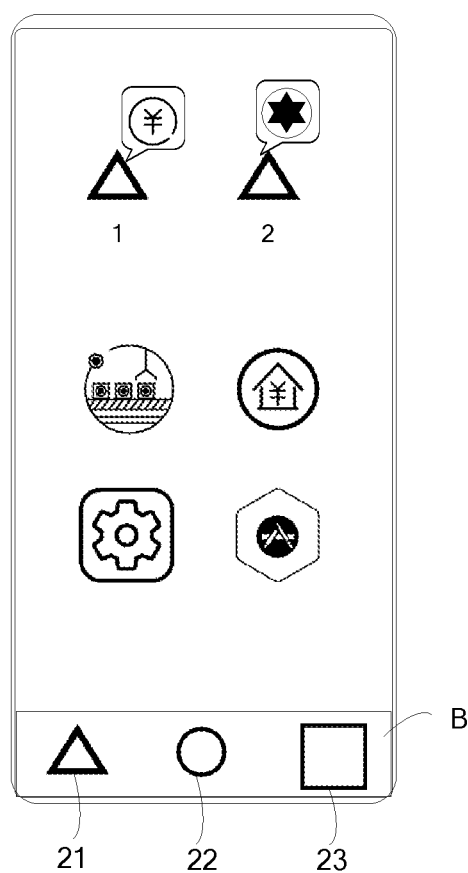

For example, as shown in FIG. 2a, in the case that the terminal displays the first page, the user sequentially drags a first identifier 12 displayed on the first page to positions where an icon 11 and an icon 15 are located, and the terminal displays the first identifier 12 on the icon 11 and the icon 15 separately. The user performs an operation to switch from the first page to the second page as shown in FIG. 2b. The user drags a second identifier 21 on the second page to two second positions separately on the second page, and the terminal displays the second identifier 21 at these two positions and displays, at the two positions on the second page, the icon 11 and icon 15 on the first page respectively according to functions indicated by the first identifier 12 and the second identifier 21.

Figure 2C:
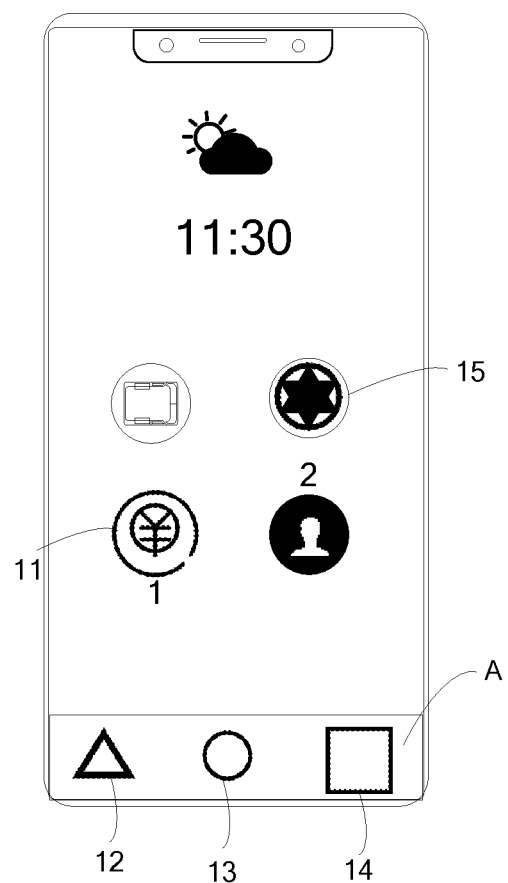
Figure 2D:
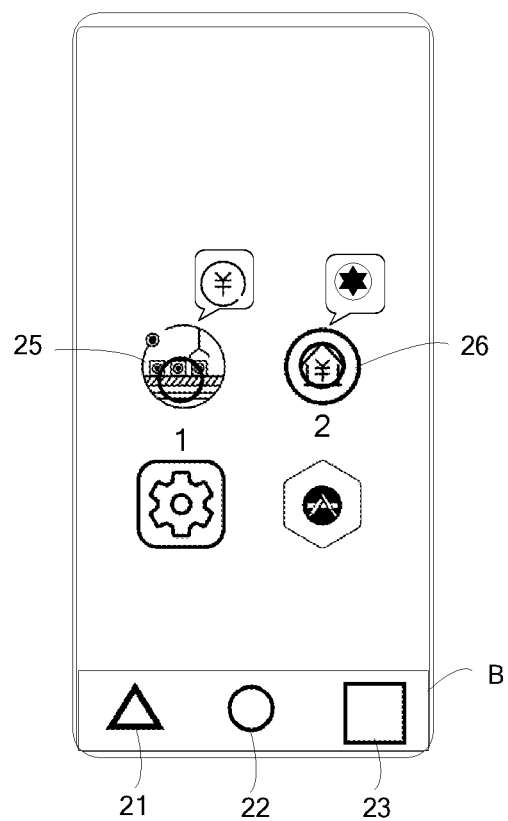

As shown in FIG. 2c, in the case that the terminal displays the first page, the user sequentially drags a first identifier 13 displayed on the first page to positions where an icon 11 and an icon 15 are located, and the terminal displays the first identifier 13 on the icon 11 and the icon 15 separately. The user performs an operation to switch from the first page to the second page as shown in FIG. 2d. The user drags a second identifier 22 on the second page to two second positions on the second page, and the terminal displays the second identifier 22 at these two positions and acquires an icon 25 and icon 26 corresponding to these two positions. Additionally, the terminal exchanges positions of the icon 11 and the icon 25, and exchanges positions of the icon 15 and the icon 26 separately according to functions indicated by the first identifier 13 and the second identifier 22.

Figure 2E:
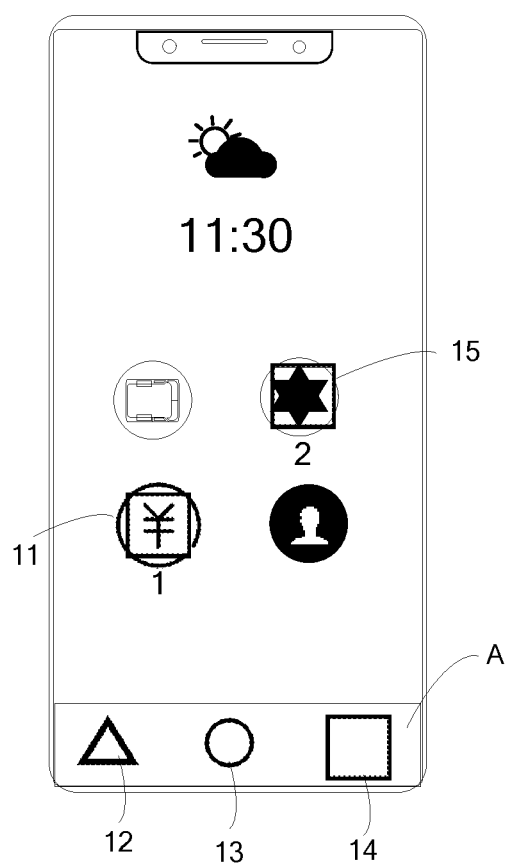
Figure 2F:
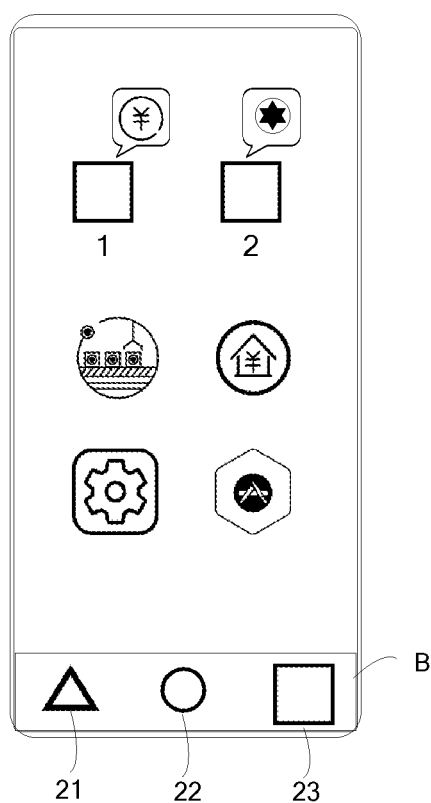

As shown in FIG. 2e, in the case that the terminal displays the first page, the user sequentially drags a first identifier 14 displayed on the first page to positions where an icon 11 and an icon 15 are located, and the terminal displays the first identifier 14 on the icon 11 and the icon 15 separately. The user performs an operation to switch from the first page to the second page as shown in FIG. 2f. The user drags a second identifier 23 on the second page to two second positions separately on the second page, and the terminal displays the second identifier 23 at these two positions, and creates clone icons for the icon 11 and icon 15 at these two positions respectively according to functions indicated by the first identifier 14 and the second identifier 23.

In this way, it is convenient for the user to perform a cross-page operation on an icon, which can enhance operation efficiency.

The foregoing N first identifiers may also be different identifiers. For example, in FIG. 1c, the user may drag the first identifier 12 to the first icon 11, and drag the first identifier 13 to the first icon 15. On the second page as shown in FIG. 1g, a dragging operation may be performed on the second identifier 21 and the second identifier 22 separately. In response to the user's operation, the terminal moves the first icon 11 to the second page according to a movement function corresponding to the first identifier 12, determines a second icon on the second page according to a position exchange function corresponding to the first identifier 13, and exchanges positions of the second icon and the first icon 15.

Further, the terminal may mark a corresponding number 1 for a first operation and a corresponding number 2 for a second operation according to a sequence of user's operations, and determine a corresponding identifier according to a marking sequence. For example, as shown in FIG. 2a, if the user performs a first input on the first icon 11 for the first time and performs a second input on the first icon 15 for the second time, the first icon 11 is marked as 1, and the second icon 15 is marked as 2. As shown in FIG. 2b, a position where the user performs the first input is marked as 1, and a position where the user performs the second input is marked as 2. The identifiers on the first page and the identifiers on the second page may correspond to each other one by one.

In this way, it is convenient for the user to perform an operation, and when many application icons need to be processed, they are processed sequentially according to a marking sequence, which can prevent misoperation and enhance operation efficiency.

In this way, it is convenient for the user to perform an operation, and when there are many icons to be processed, they are processed sequentially according to a sequence, which can prevent misoperation and enhance operation efficiency.

Optionally, the second input includes N touch points;

the displaying a second identifier at a second position on the second page includes:

displaying a $j^{th}$ second identifier at a $j^{th}$ second position of a $j^{th}$ touch point on the second page;

where j is a positive integer and j≤N.

In this embodiment, the user may perform a second input on the second page, and the second input includes N touch points, where the N touch points may be used to determine N second positions.

For example, the user performs pressing operations at two positions simultaneously on the second page with two fingers, and the terminal displays one identifier at each of the two positions. The terminal may also sort the two positions, and display one second identifier at each of the two positions sequentially. A sequence of each second position may be determined according to a touch sequence, or determined in any manner.

In this way, the user can quickly determine multiple second positions on the second page, which enhances both operation efficiency and icon display efficiency.

Optionally, after the displaying a $k^{th}$ second identifier at a $k^{th}$ second position on the second page, the method further includes:

displaying prompt information in a preset region where at least one second identifier is located, the prompt information used to indicate the content of an icon associated with the second identifier.

In this embodiment, the terminal displays the prompt information in the preset region where the second identifier is located. The prompt information may specifically be a thumbnail of the icon associated with the second identifier or text prompt information of the icon. The icon associated with the second identifier may be understood as an icon that will be displayed at a position indicated by the second identifier.

For example, as shown in FIG. 2b, the user drags the second identifier 21 to two positions on the second page separately, and the terminal displays bubbles near these two positions and displays in the bubbles a thumbnail of a first icon associated with the second identifier separately.

In this way, the user may view, based on the displayed prompt information, the icon to be displayed at the position indicated by the second identifier, to prevent misoperation, thereby enhancing operation efficiency.

Optionally, the method further includes:

receiving a fifth input performed by a user on a target identifier in a target region;

controlling, in response to the fifth input, the target identifier to move according to a position of the fifth input; and in the case that the target identifier is located in a first preset region of the terminal, canceling the display of the first icon or the associated icon;

where the target region includes at least the first identifier or the second identifier, and the target identifier is any identifier in the target region.

In this embodiment, the target region may include one or more identifiers. The user may perform an operation on any identifier in the target region, that is, the fifth input. In the case that the target identifier is located in a first preset region of the terminal, for example, an edge of a screen, the terminal cancels an operation on a first icon, that is, cancels the display of the first icon or an icon associated with the first icon. Specifically, it's possible that only the last operation is canceled. In this way, user's operations can be reduced.

Figure 2G:
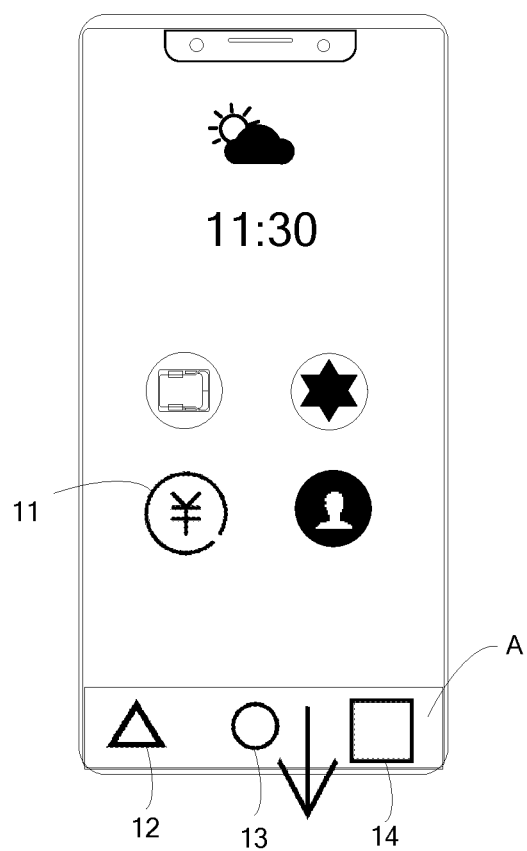

For example, as shown in FIG. 2g, the user performs a downward sliding operation in the first region A of the first page, and the terminal cancels, in response to this operation, the operation of moving the first icon 11 to the second page.

The foregoing target region may be a fixed region, and the first identifier and the second identifier may be the same or different identifiers.

In this way, in the case of a user misoperation, it is possible to cancel it through this embodiment, which can reduce user operations and enhance operation efficiency.

Optionally, after the displaying, in the first region of the first page, at least one identifier including the first identifier, and displaying, in a second region of the second page, at least one identifier including the second identifier, the method further includes:

receiving a sixth input performed by a user in the first region or the second region; and in the case that an input destination of the sixth input is located in a second preset region of the terminal, hiding at least one identifier in the first region and at least one identifier in the second region.

In this embodiment, the user may perform an operation in the first region or the second region, that is, the sixth input, which may specifically be a sliding operation, a tap operation, or a multi-finger sliding operation.

Figure 2H:
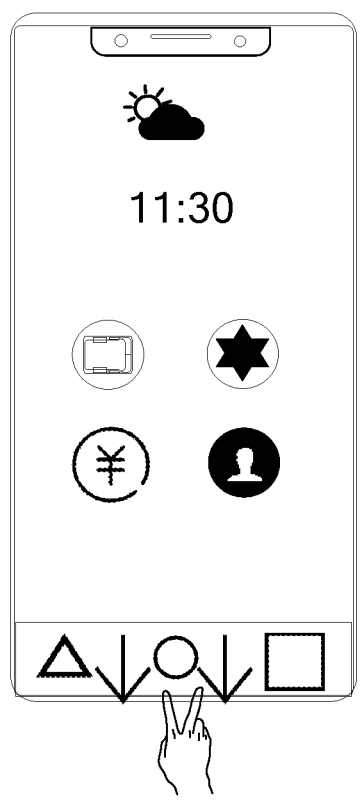

For example, as shown in FIG. 2h, in the case that the terminal is displayed as an icon adjustment interface, that is, at least one identifier is displayed in the first region of the first page, the user performs an operation of sliding toward the screen edge with two fingers in the first region. In the case that a destination of the sliding operation passes the screen edge, the terminal hides both at least one identifier in the first region and at least one identifier in the second region, that is, it's displayed as a desktop icon interface.

In this way, the user can control the terminal to hide identifiers in the first region and the second region through an operation, that is, switch an icon adjustment interface to a desktop, which is convenient for the user to perform another operation.

In this embodiment of the present disclosure, the user may perform operations on multiple icons so that the terminal can process multiple icons, which can enhance the efficiency of managing an application icon.

Figure 3:
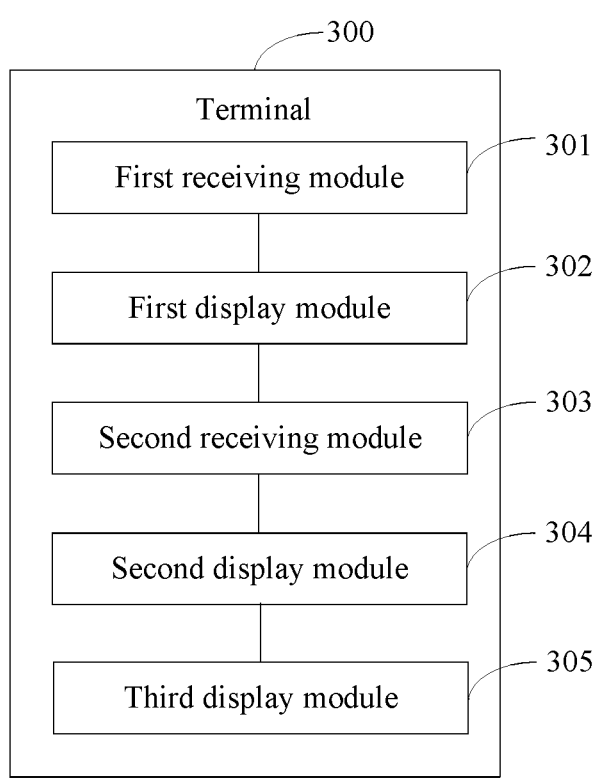
FIG. 3 is a first structural diagram of a terminal according to an embodiment of the present disclosure.

Referring to FIG. 3, FIG. 3 is a structural diagram of a terminal according to an embodiment of the present disclosure. As shown in FIG. 3, a terminal 300 includes:

a first receiving module 301, configured to receive a first input performed by a user on a first icon, the first icon located at a first position on a first page;

a first display module 302, configured to display, in response to the first input, a first identifier at the first position or a position associated with the first position;

a second receiving module 303, configured to receive a second input performed by a user on a second page;

a second display module 304, configured to display, in response to the second input, a second identifier at a second position on the second page;

a third display module 305, configured to display, at the second position, the first icon or an icon associated the first icon.

Optionally, the terminal further includes:

a fourth display module, configured to display a first identifier in a first region of the first page;

the first receiving module is specifically configured to receive a first input of dragging a first identifier located in the first region from the first region onto the first icon by a user;

the first display module is specifically configured to move, in response to the first input, the first identifier from the first region to the first position or a position associated with the first position.

Optionally, the terminal further includes:

a fifth display module, configured to display a second identifier in a second region of the second page;

the second receiving module is specifically configured to receive a second input of dragging a second identifier located in the second region from the second region to a second position on the second page by a user;

the second display module is specifically configured to move, in response to the second input, the second identifier from the second region to the second position.

Optionally, the fourth display module includes:

a receiving sub-module, configured to receive a third input performed by a user; and a first display sub-module, configured to display, in response to the third input and in the first region of the first page, at least one identifier including the first identifier, and display, in a second region of the second page, at least one identifier including the second identifier.

Optionally, the terminal further includes:

a third receiving module, configured to receive a fourth input performed by a user; and a switching module, configured to switch, in the case that an operation direction of the fourth input is a first direction, an operation mode for an icon from a current first mode to a second mode;

where the first mode is a mode for operating a single icon, and the second mode is a mode for operating at least two icons; or, the first mode is a mode for operating at least two icons, and the second mode is a mode for operating a single icon.

Optionally, the first display module includes:

a first acquiring sub-module, configured to acquire a first input track of the first input; and a first generating sub-module, configured to generate the first identifier according to a first input track of the first input;

a second display sub-module, configured to display the first identifier at the first position or a position associated with the first position.

Optionally, the second display module includes:

a second acquiring sub-module, configured to acquire a second input track of the second input;

a second generating sub-module, configured to generate the second identifier according to a second input track of the second input; and a third display submodule, configured to display the second identifier at a second position on the second page.

Optionally, a quantity of the first icons is N, N is an integer greater than 1, the first input includes N first sub-inputs, and each first sub-input acts on one first icon;

the first display module is specifically configured for:

displaying, according to an input sequence of an $i^{th}$ first sub-input, an $i^{th}$ first identifier at an ith first position or a position associated with the $i^{th}$ first position;

where i is a positive integer and i≤N.

Optionally, the second input includes N second sub-inputs, and each second sub-input is used to determine one second position on the second page;

the second display module is specifically configured for:

displaying a $k^{th}$ second identifier at a $k^{th}$ second position on the second page according to an input sequence of a $k^{th}$ second sub-input;

where k is a positive integer and k≤N.

Optionally, the second input includes N touch points;

the second display module is specifically configured for:

displaying a $j^{th}$ second identifier at a $j^{th}$ second position of a $j^{th}$ touch point on the second page;

where j is a positive integer and j≤N.

Optionally, the terminal further includes:

a sixth display module, configured to display prompt information in a preset region where at least one second identifier is located, the prompt information used to indicate the content of an icon associated with the second identifier.

The terminal 300 can implement each process implemented by the terminal in the foregoing method embodiment. To avoid repetition, details are not described herein again.

In the terminal 300 of this embodiment of the present disclosure, a user can control the terminal to display, on a second page, an application icon on a first page by performing operations on the first page and the second page, which facilitates convenient user operation.

Figure 4:
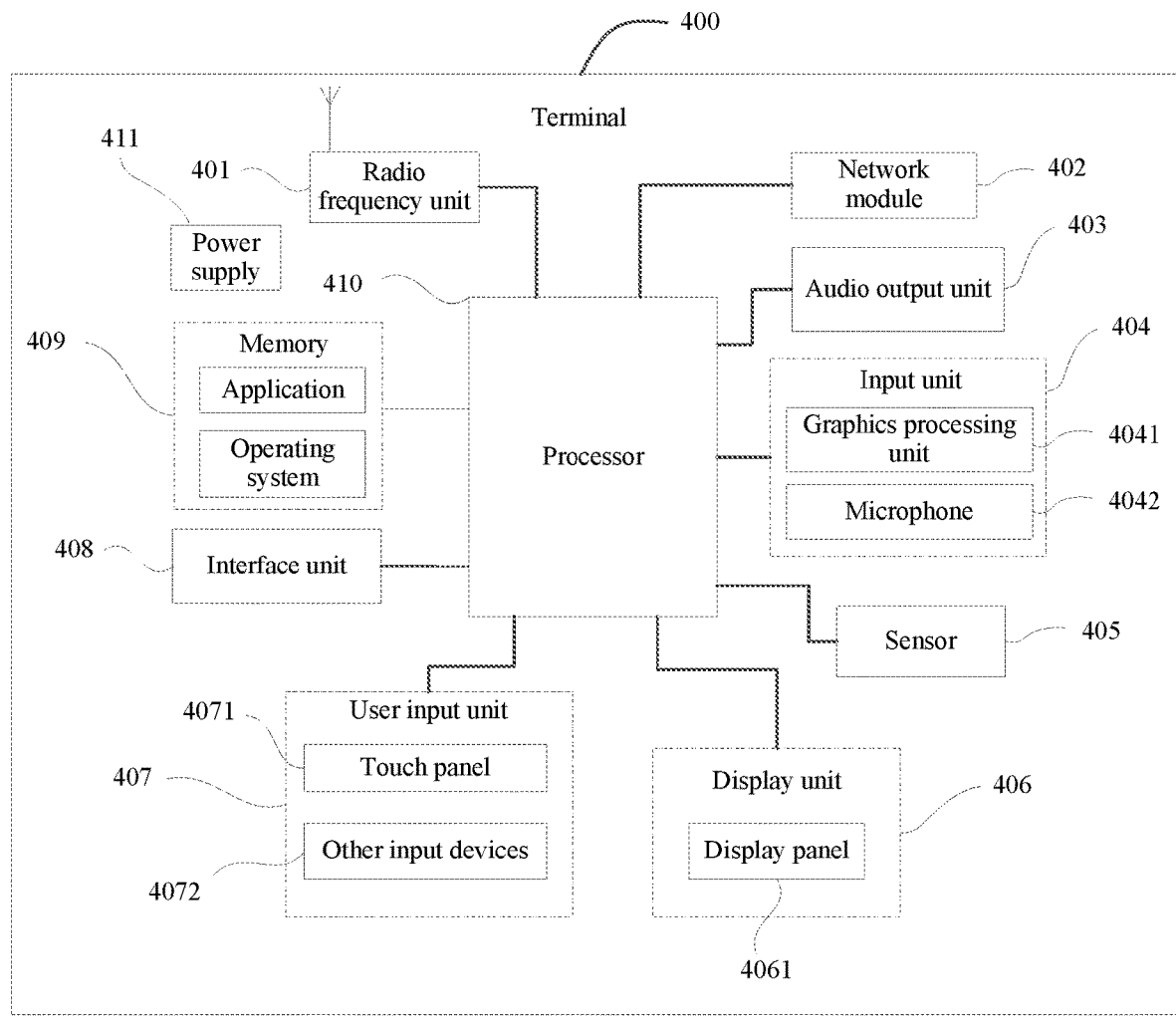
FIG. 4 is a second structural diagram of a terminal according to an embodiment of the present disclosure.

FIG. 4 is a schematic diagram of a structure of hardware of a terminal implementing embodiments of the present disclosure. The terminal 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and other components. It may be understood by persons skilled in the art that, the terminal structure shown in FIG. 4 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 410 is configured to control the user input unit 407 to receive a first input on a first icon by a user, the first icon located at a first position of a first page;

displaying, in response to the first input, a first identifier at the first position or a position associated with the first position;

control the user input unit 407 to receive a second input on a second page by a user;

control the display unit 406 to display, in response to the second input, a second identifier at a second position on the second page;

control the display unit 406 to display the first icon or an icon associated with the first icon at the second position.

In this way, the user can control the terminal to display, on the second page, the application icon on the first page by performing operations on the first page and the second page, which facilitates convenient user operation.

Optionally, the processor 410 is configured to control the display unit 406 to display a first identifier in a first region of the first page;

The processor 410 controls the user input unit 407 to execute the receiving a first input on a first icon by a user, including:

receiving a first input of dragging a first identifier located in the first region from the first region onto the first icon by a user;

The processor 410 controls the display unit 406 to execute the displaying, in response to the first input, a first identifier at the first position or a position associated with the first position, including:

moving, in response to the first input, the first identifier from the first region to the first position or a position associated with the first position.

Optionally, the processor 410 is configured to control the display unit 406 to display a second identifier in a second region of the second page;

The processor 410 controls the user input unit 407 to execute the receiving a second input on a second page by a user, including:

receiving a second input of dragging a second identifier located in the second region from the second region to a second position on the second page by a user;

The processor 410 controls the display unit 406 to execute the displaying, in response to the second input, a second identifier at a second position on the second page, including:

moving, in response to the second input, the second identifier from the second region to the second position.

Optionally, the processor 410 controls the display unit 406 to execute the displaying a first identifier in a first region of the first page, including:

receiving a third input performed by a user; and in response to the third input, displaying, in the first region of the first page, at least one identifier including the first identifier, and displaying, in a second region of the second page, at least one identifier including the second identifier.

Optionally, the processor 410 is further configured to control the user input unit 407 to receive a fourth input performed by a user;

in the case that an operation direction of the fourth input is a first direction, switching an operation mode for an icon from a current first mode to a second mode;

where the first mode is a mode for operating a single icon, and the second mode is a mode for operating at least two icons; or, the first mode is a mode for operating at least two icons, and the second mode is a mode for operating a single icon.

Optionally, the processor 410 controls the display unit 406 to execute the displaying, in response to the first input, a first identifier at the first position or a position associated with the first position, including:

acquiring a first input track of the first input;

generating the first identifier according to a first input track of the first input; and displaying the first identifier at the first position or a position associated with the first position.

Optionally, the processor 410 controls the display unit 406 to execute displaying, in response to the second input, a second identifier at a second position on the second page, including:

acquiring a second input track of the second input;

generating the second identifier according to a second input track of the second input; and displaying the second identifier at a second position on the second page.

Optionally, a quantity of the first icons is N, N is an integer greater than 1, the first input includes N first sub-inputs, and each first sub-input acts on one first icon;

The processor 410 controls the display unit 406 to execute displaying, in response to the first input, a first identifier at the first position or a position associated with the first position, including:

displaying, according to an input sequence of an $i^{th}$ first sub-input, an $i^{th}$ first identifier at an $i^{th}$ first position or a position associated with the $i^{th}$ first position;

where i is a positive integer and i≤N.

Optionally, the second input includes N second sub-inputs, and each second sub-input is used to determine one second position on the second page;

The processor 410 controls the display unit 406 to execute displaying, in response to the second input, a second identifier at a second position on the second page, including:

displaying a $k^{th}$ second identifier at a $k^{th}$ second position on the second page according to an input sequence of a $k^{th}$ second sub-input;

where k is a positive integer and k≤N.

Optionally, the second input includes N touch points;

The processor 410 controls the display unit 406 to execute the displaying a second identifier at a second position on the second page, including:

displaying a $j^{th}$ second identifier at a $j^{th}$ second position of a $j^{th}$ touch point on the second page;

where j is a positive integer and j≤N.

Optionally, the processor 410 is further configured to control the display unit 406 to display prompt information in a preset region where at least one second identifier is located, where the prompt information is used to indicate the content of an icon associated with the second identifier.

It should be understood that, in this embodiment of the present disclosure, the radio frequency unit 401 may be configured to transmit and receive information, or transmit or receive a signal during a call. Specifically, the radio frequency unit transmits downlink data to the processor 410 for processing after receiving the downlink data from a base station; and in addition, transmits uplink data to the base station. Generally, the radio frequency unit 401 includes but is not limited to an antenna, at least one amplifier, a transceiver, a coupler, a low noise amplifier, and a duplexer. In addition, the radio frequency unit 401 may further communicate with another device through a wireless communications system and network.

The terminal provides wireless broadband Internet access to a user through the network module 402, for example, helps the user receive and send e-mails, browse web pages, and access streaming media, etc.

The audio output unit 403 may convert audio data received by the radio frequency unit 401 or the network module 402 or stored in the memory 409 into an audio signal, and output the audio signal into sound. In addition, the audio output unit 403 may further provide an audio output (for example, a call signal received voice, or a message received voice) related to a specific function executed by the user equipment 400. The audio output unit 403 includes a loudspeaker, a buzzer, a receiver, and the like.

The input unit 404 is configured to receive an audio signal or a video signal. The input unit 404 may include a graphics processing unit (Graphics Processing Unit, GPU) 4041 and a microphone 4042. The graphics processing unit 4041 processes image data of a static picture or a video obtained by an image capturing apparatus (for example, a camera) in a video capturing mode or an image capturing mode. A processed image frame may be displayed on the display unit 406. The image frame processed by the graphics processing unit 4041 may be stored in the memory 409 (or other storage mediums) or sent by using the radio frequency unit 401 or the network module 402. The microphone 4042 may receive a sound and can process such sound into audio data. The processed audio data may be converted, in a telephone call mode, into a format that may be sent by the radio frequency unit 401 to a mobile communication base station for output.

The terminal 400 further includes at least one sensor 405, such as a light sensor, a motion sensor, and other sensors. Specifically, the light sensor includes an ambient light sensor and a proximity sensor. The ambient light sensor can adjust a brightness of a display panel 4061 based on a brightness of ambient light. The proximity sensor can close the display panel 4061 and/or backlight when the terminal 400 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information entered by a user or information provided for the user. The display unit 406 may include a display panel 4061, and the display panel 4061 may be configured in a form of a liquid crystal display (Liquid Crystal Display, LCD), an organic light-emitting diode (Organic Light-Emitting Diode, OLED), or the like.

The user input unit 407 may be configured to receive input numeric or character information, and generate key signal inputs related to user settings and function control of the user equipment. Specifically, the user input unit 407 includes a touch panel 4071 and another input device 4072. The touch panel 4071 is also referred to as a touchscreen, and may collect a touch operation performed by a user on or near the touch panel 4071 (such as an operation performed by a user on the touch panel 4071 or near the touch panel 4071 by using any proper object or accessory, such as a finger or a stylus). The touch panel 4071 may include two parts: a touch detection device and a touch controller. The touch detection device detects a touch position of the user, detects a signal brought by a touch operation, and transmits the signal to the touch controller. The touch controller receives touch information from the touch detection device, converts the touch information into contact coordinates, sends the contact coordinates to the processor 410, and receives and executes a command from the processor 410. In addition, the touch panel 4071 may be implemented by using a plurality of types such as a resistive type, a capacitive type, an infrared ray type, and a surface acoustic wave type. In addition to the touch panel 4071, the user input unit 407 may also include other input devices 4072. Specifically, other input devices 4072 may include but are not limited to at least one of a physical keyboard, a functional button (such as a volume control button or a power on/off button), a trackball, a mouse, and a joystick. Details are not described herein.

Further, the touch panel 4071 may cover the display panel 4061. After detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. Although in FIG. 4, the touch panel 4071 and the display panel 4061 are configured as two independent components to implement input and output functions of the terminal, in some embodiments, the touch panel 4071 and the display panel 4061 can be integrated to implement the input and output functions of the terminal. Details are not limited herein.

The interface unit 408 is an interface for connecting an external apparatus to the terminal 400. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, and a headset jack. The interface unit 408 may be configured to receive input (for example, data information and power) from an external apparatus and transmit the received input to one or more elements within the terminal 400, or may be configured to transmit data between the terminal 400 and the external apparatus.

The memory 409 may be configured to store software programs and various data. The memory 409 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 409 may include a high-speed random access memory, or may include a nonvolatile memory, for example, at least one disk storage device, a flash memory, or another volatile solid-state storage device.

The processor 410 is a control center of the terminal. The processor 410 uses various interfaces and lines to connect the various parts of the entire terminal, and performs various functions of the terminal and processes data by running or executing software programs and/or modules stored in the memory 409 and invoking data stored in the memory 409, to monitor the terminal as a whole. The processor 410 may include one or more processing units. Optionally, the processor 410 may be integrated with an application processor and a modem processor. The application processor mainly processes the operating system, the user interface, applications, etc. The modem processor mainly processes wireless communication. It can be understood that the foregoing modem processor may not be integrated into the processor 410.

The terminal 400 may also include a power supply 411 (for example, a battery) that supplies power to various components. Optionally, the power supply 411 may be logically connected to the processor 410 through a power supply management system, to perform functions of managing charging, discharging, and power consumption through the power supply management system.

In addition, the terminal 400 includes some function modules that are not shown, which are not elaborated herein.

Optionally, an embodiment of the present disclosure further provides a terminal, including a processor 410, a memory 409, and a computer program that is stored in the memory 409 and that can run on the processor 410. When the computer program is executed by the processor 410, each process of the foregoing icon display method embodiments can be implemented, and a same technical effect can be achieved. To avoid repetition, details are not described herein.

An embodiment of the present disclosure further provides a computer-readable storage medium. The computer-readable storage medium stores a computer program. The computer program implements, when executed by the processor, each process of the foregoing embodiments of the icon display method, and a same technical effect can be achieved. To avoid repetition, details are not described herein. The computer-readable storage medium includes a read-only memory (Read-Only Memory, ROM), a random access memory (Random Access Memory, RAM), a magnetic disk, an optical disc, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely examples instead of restrictions. With enlightenment because of the present disclosure, a person of ordinary skills in the art may make many forms without departing from the aim of the present disclosure and the protection scope of the claims, all of which fall within the protection of the present disclosure.

The invention claimed is:

1. An icon display method, applied to a terminal and comprising:
   receiving N first sub-inputs performed by a user on N first icons, the N first icons located at a first position on a first page, wherein N is an integer greater than 1, each first sub-input of the N first sub-inputs acts on one first icon of the N first icons;
   displaying, according to an input sequence of an $i^{th}$ first sub-input of the N first sub-inputs, an $i^{th}$ first identifier of N first identifiers at an $i^{th}$ first position or a position associated with the $i^{th}$ first position, wherein i is a positive integer and i≤N;
   receiving a second input performed by a user on a second page;
   in a case that the second input comprises N second sub-inputs and each second sub-input is used to determine one second position of N second positions on the second page, displaying a $k^{th}$ second identifier of N second identifiers at a $k^{th}$ second position on the second page according to an input sequence of a $k^{th}$ second sub-input, k being a positive integer and k≤N; or, in a case that the second input comprises N touch points, displaying a $j^{th}$ second identifier at a $j^{th}$ second position of a $j^{th}$ touch point on the second page, j being a positive integer and j≤N;
   displaying, at the N second positions, the N first icons or an icon associated with the N first icons.

2. The method according to claim 1, wherein before the receiving N first sub-inputs performed by a user on N first icons, the method further comprises:
   displaying the N first identifiers in a first region of the first page;
   the receiving N first sub-inputs performed by a user on N first icons comprises:
   receiving the N first sub-inputs of dragging the N first identifiers located in the first region from the first region onto the N first icons by the user;
   the displaying, according to an input sequence of an $i^{th}$ first sub-input, an $i^{th}$ first identifier at an $i^{th}$ first position or a position associated with the $i^{th}$ first position comprises:
   moving, in response to the $i^{th}$ first sub-input, the $i^{th}$ first identifier from the first region to the $i^{th}$ first position or a position associated with the $i^{th}$ first position.

3. The method according to claim 2, wherein the displaying the N first identifiers in a first region of the first page comprises:
   receiving a third input performed by the user; and
   in response to the third input, displaying, in the first region of the first page, at least one identifier comprising the N first identifiers, and displaying, in a second region of the second page, at least one identifier comprising the N second-identifiers.

4. The method according to claim 3, wherein after the displaying, in the first region of the first page, at least one identifier comprising the N first identifiers, and displaying, in a second region of the second page, at least one identifier comprising the N second identifiers, and before the receiving the N first sub-inputs of dragging the N first identifiers located in the first region from the first region onto the N first icons by a user, the method further comprises:
   receiving a fourth input performed by the user; and
   in the case that an operation direction of the fourth input is a first direction, switching an operation mode for an icon from a current first mode to a second mode;
   wherein the first mode is a mode for operating a single icon, and the second mode is a mode for operating at least two icons; or, the first mode is a mode for operating at least two icons, and the second mode is a mode for operating a single icon.

5. The method according to claim 1, wherein the displaying, according to an input sequence of an $i^{th}$ first sub-input of the N first sub-inputs, an $i^{th}$ first identifier of N first identifiers at an $i^{th}$ first position or a position associated with the $i^{th}$ first position comprises:
   acquiring a first input track of the $i^{th}$ first sub-input;
   generating the $i^{th}$ first identifier according to a first input track of the $i^{th}$ first input; and
   displaying the $i^{th}$ first identifier at the $i^{th}$ first position or a position associated with the $i^{th}$ first position.

6. The method according to claim 1, wherein the displaying a $k^{th}$ second identifier of N second identifiers at a $k^{th}$ second position on the second page according to an input sequence of a $k^{th}$ second sub-input comprises:
   acquiring a second input track of the $k^{th}$ second sub-input;
   generating the $k^{th}$ second identifier according to the second input track of the $k^{th}$ second sub-input; and
   displaying the $k^{th}$ second identifier at the $k^{th}$ second position on the second page.

7. The method according to claim 1, wherein after the displaying a $k^{th}$ second identifier at a $k^{th}$ second position on the second page, the method further comprises:
   displaying prompt information in a preset region where at least one second identifier is located, the prompt information used to indicate the content of an icon associated with the at least one second identifier.

8. The method according to claim 1, wherein before the receiving a second input performed by a user on a second page, the method further comprises:
   displaying the N second identifiers in a second region of the second page;
   the receiving a second input performed by a user on a second page comprises:
   receiving the N second sub-inputs of dragging the N second identifiers located in the second region from the second region to the N second positions on the second page by the user;
   the displaying a $k^{th}$ second identifier of N second identifiers at a $k^{th}$ second position on the second page according to an input sequence of a $k^{th}$ second sub-input comprises:
   moving, in response to the $k^{th}$ second sub-input, the $k^{th}$ second identifier from the second region to the $k^{th}$ second position.

9. A terminal device, comprising: a memory, a processor, and a computer program stored in the memory and capable of running on the processor, wherein when the computer program is executed by the processor, the terminal device implements:

receiving N first sub-inputs performed by a user on N first icons, the N first icons located at a first position on a first page, wherein N is an integer greater than 1, each first sub-input of the N first sub-inputs acts on one first icon of the N first icons;

displaying, according to an input sequence of an $i^{th}$ first sub-input of the N first sub-inputs, an $i^{th}$ first identifier of N first identifiers at an $i^{th}$ first position or a position associated with the $i^{th}$ first position, wherein i is a positive integer and i≤N;

receiving a second input performed by a user on a second page;

in a case that the second input comprises N second sub-inputs and each second sub-input is used to determine one second position of N second positions on the second page, displaying a $k^{th}$ second identifier of N second identifiers at a $k^{th}$ second position on the second page according to an input sequence of a $k^{th}$ second sub-input, k being a positive integer and k≤N; or, in a case that the second input comprises N touch points, displaying a $j^{th}$ second identifier at a $j^{th}$ second position of a $j^{th}$ touch point on the second page, j being a positive integer and j≤N;

displaying, at the N second position, the N first icons or an icon associated with the N first, icons.

10. The terminal device according to claim 9, wherein before the receiving N first sub-inputs performed by a user on N first icons, wherein when the computer program is executed by the processor, the terminal device further implements:

displaying the N first identifiers in a first region of the first page;

the receiving N first sub-inputs performed by a user on N first icons comprises:

receiving the N first sub-inputs of dragging the N first identifiers located in the first region from the first region onto the N first icons by the user;

the displaying, according to an input sequence of an $i^{th}$ first sub-input, an $i^{th}$ first identifier at an $i^{th}$ first position or a position associated with the $i^{th}$ first position comprises:

moving, in response to the $i^{th}$ first sub-input, the $i^{th}$ first identifier from the first region to the $i^{th}$ first position or a position associated with the $i^{th}$ first position.

11. The terminal device according to claim 10, wherein the displaying the N first identifiers in a first region of the first page comprises:

receiving a third input performed by the user; and in response to the third input, displaying, in the first region of the first page, at least one identifier comprising the N first identifiers, and displaying, in a second region of the second page, at least one identifier comprising the N second identifiers.

12. The terminal device according to claim 11, wherein after the displaying, in the first region of the first page, at least one identifier comprising the N first identifiers, and displaying, in a second region of the second page, at least one identifier comprising the N second identifiers, and before the receiving the N first sub-inputs of dragging the N first identifiers located in the first region from the first region onto the N first icons by a user, wherein when the computer program is executed by the processor, the terminal device further implements:

receiving a fourth input performed by the user; and in the case that an operation direction of the fourth input is a first direction, switching an operation mode for an icon from a current first mode to a second mode;

wherein the first mode is a mode for operating a single icon, and the second mode is a mode for operating at least two icons; or, the first mode is a mode for operating at least two icons, and the second mode is a mode for operating a single icon.

13. The terminal device according to claim 9, wherein the displaying, according to an input sequence of an $i^{th}$ first sub-input of the N first sub-inputs, an $i^{th}$ first identifier of N first identifiers at an $i^{th}$ first position or a position associated with the $i^{th}$ first position comprises:

acquiring a first input track of the $i^{th}$ first sub-input;

generating the $i^{th}$ first identifier according to a first input track of the $i^{th}$ first input; and displaying the $i^{th}$ first identifier at the $i^{th}$ first position or a position associated with the $i^{th}$ first position.

14. The terminal device according to claim 9, wherein the displaying a $k^{th}$ second identifier of N second identifiers at a $k^{th}$ second position on the second page according to an input sequence of a $k^{th}$ second sub-input comprises:

acquiring a second input track of the $k^{th}$ second sub-input;

generating the $k^{th}$ second identifier according to the second input track of the $k^{th}$ second sub-input; and displaying the $k^{th}$ second identifier at the $k^{th}$ second position on the second page.

15. The terminal device according to claim 9, wherein after the displaying a $k^{th}$ second identifier at a $k^{th}$ second position on the second page, wherein when the computer program is executed by the processor, the terminal device further implements:

displaying prompt information in a preset region where at least one second identifier is located, the prompt information used to indicate the content of an icon associated with the at least one second identifier.

16. The terminal device according to claim 9, wherein before the receiving a second input performed by a user on a second page, wherein when the computer program is executed by the processor, the terminal device further implements:

displaying the N second identifiers in a second region of the second page;

the receiving a second input performed by a user on a second page comprises:

receiving the N second sub-input of dragging the N second identifiers located in the second region from the second region to the N second positions on the second page by the user;

the displaying a $k^{th}$ second identifier of N second identifiers at a $k^{th}$ second position on the second page according to an input sequence of a $k^{th}$ second sub-input comprises:

moving, in response to the $k^{th}$ second sub-input, the $k^{th}$ second identifier from the second region to the $k^{th}$ second position.

* * * * *